T. H. Body

Churn.

No. 86,274. Patented Jan. 26, 1869.

Witnesses,
H. Smith
J. B. Harrington

Inventor.
T. H. Body
Chipman Hosmer & Co
Attys

THOMAS H. BODY, OF WHITE CREEK, WISCONSIN.

*Letters Patent No. 86,274, dated January 26, 1869.*

IMPROVEMENT IN CHURNS.

The Schedule referred to in these Letters Patent and making part of the same.

*To all whom it may concern:*

Be it known that I, THOMAS H. BODY, of White Creek, in the county of Adams, and State of Wisconsin, have invented a new and valuable Improvement in Churns; and I do hereby declare that the following is a full, clear, and exact description of the construction and operation of the same, reference being had to the annexed drawings, making a part of this specification, and to the letters and figures of reference marked thereon.

Figure 1:
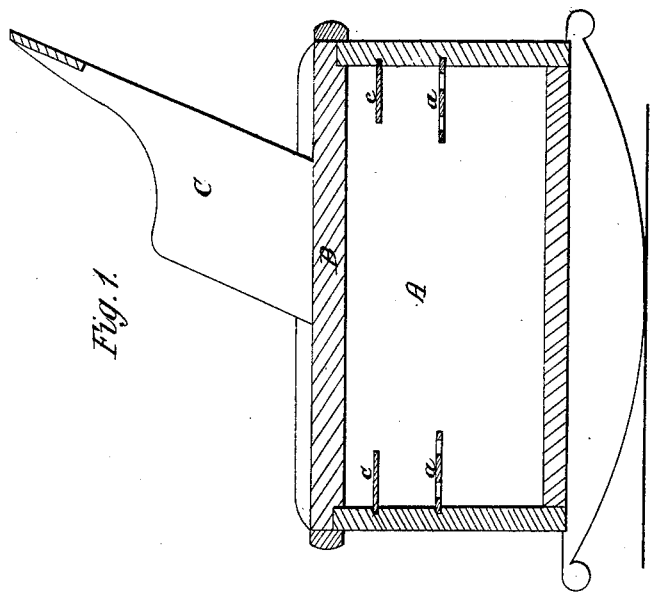

Figure 1, of the drawings, is a sectional view of my churn, and

Figure 2:
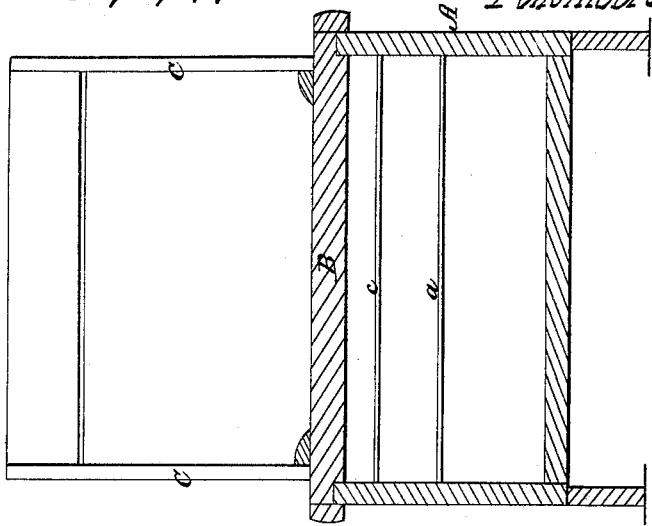

Figure 2 is an end view thereof, with the rear part of the box removed.

My invention relates to that class of churns in which the work is accomplished by a rocking motion, and the object is to provide more simple and effective means than have heretofore been devised for accomplishing the object desired.

The letter A, of the drawings, represents a quadrangular box, with rockers attached underneath, and the letter B is the cover thereof, grooved out near its edges in such manner as to fit closely upon the box, in the manner shown.

The letters $a$ represent perforated shelves, placed at each end of the box A, and the letters $c$ are shelves not perforated, placed above the shelves $a$, as represented.

The letter C represents upright arms, across which a seat may be placed, when it is desirable so to do.

These arms are connected at their tops by a cross-bar, as shown in fig. 2, which serves as a back to the seat, when used for that purpose.

My churn is operated as follows, namely:

The cream or milk to be churned is placed in the box A, and the cover adjusted on said box. A rocking motion is then commenced, and carried on until the butter is extracted.

The cream or milk is forced through the apertures of the shelves $a$, and against the shelves $c$, at each forward and backward movement of the rockers, creating great agitation in the fluid, and forcing the butter from its capsules with great rapidity.

The rocking may be done by the operator while standing by the side of the churn, or by using the churn as a rocking-chair, the operator sitting upon the top thereof.

What I claim as my invention, and desire to secure by Letters Patent, is—

A rocking churn, having box A, cover B, arms C, and shelves $a$ and $c$, constructed, arranged, and operating substantially as herein specified.

In testimony that I claim the above, I have hereunto subscribed my name, in the presence of two witnesses.

T. H. BODY.

Witnesses:
 GEO. B. BACON,
 L. MILLER.